United States Patent
Ueoka et al.

(10) Patent No.: US 8,010,270 B2
(45) Date of Patent: Aug. 30, 2011

(54) VEHICLE CONTROLLER AND CONTROL METHOD

(75) Inventors: Kiyoshiro Ueoka, Nisshin (JP); Kenji Oonishi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 108 days.

(21) Appl. No.: 12/252,228

(22) Filed: Oct. 15, 2008

(65) Prior Publication Data

US 2009/0112432 A1   Apr. 30, 2009

(30) Foreign Application Priority Data

Oct. 31, 2007   (JP) .................................. 2007-284239

(51) Int. Cl.
*G06F 7/70* (2006.01)
*G05D 1/00* (2006.01)
*B60K 6/20* (2007.10)

(52) U.S. Cl. .......................... 701/70; 701/84; 180/65.21

(58) Field of Classification Search .................... 701/70, 701/22, 81; 180/174–179, 202, 6.28, 214, 180/216, 218, 242, 279, 53.5, 60, 65.1–65.8; 280/735, 707, 422; 340/428

See application file for complete search history.

(56) References Cited

U.S. PATENT DOCUMENTS

| | | | | |
|---|---|---|---|---|
| 6,113,515 A | * | 9/2000 | Salecker et al. | ................ 477/72 |
| 6,346,064 B1 | * | 2/2002 | Hada et al. | ..................... 477/171 |
| 6,896,340 B2 | * | 5/2005 | Kinser et al. | .................. 303/192 |

FOREIGN PATENT DOCUMENTS

| | | |
|---|---|---|
| JP | 07-184304 A | 7/1995 |
| JP | 10-329671 A | 12/1998 |
| JP | EP1403547 A2 * | 3/2004 |
| JP | 2006-232014 A | 7/2006 |
| JP | 2007-168650 A | 7/2007 |
| JP | 2007-202264 A | 8/2007 |

* cited by examiner

*Primary Examiner* — James P Trammell
*Assistant Examiner* — Muhammad Shafi
(74) *Attorney, Agent, or Firm* — Kenyon & Kenyon LLP (57) ABSTRACT

An ECU releases brake hold control when an actual accelerator pedal position A exceeds a predetermined position A(0) while the brake hold control is being executed. Further, the ECU determines whether or not the actual accelerator pedal position A is larger than a position A(1), which is a value smaller than the predetermined position A(0), and if it is larger than the predetermined position A(1), executes a process for increasing a creep torque reflection ratio R to recover creep force that has been stopped.

4 Claims, 6 Drawing Sheets

FIG. 6 ations, and the vehicle starting characteristic as
VEHICLE CONTROLLER AND CONTROL METHOD This nonprovisional application is based on Japanese Patent Application No. 2007-284239 filed with the Japan Patent Office on Oct. 31, 2007, the entire contents of which are hereby incorporated by reference.

BACKGROUND OF THE INVENTION

1. Field of the Invention

The present invention relates to vehicle control and, more specifically, to control of a vehicle with a brake hold control function by which braking force is held even when a brake pedal is not stepped on by the driver.

2. Description of the Background Art

Recently, a vehicle has been proposed that has automatic transmission and executes control of holding braking force at a halt (brake hold control) even if a brake pedal is not operated, when degree of brake pedal operation (for example, amount of operation of the brake pedal) exceeds a prescribed degree while the vehicle is stopped in the forward position, in order to alleviate load of braking operation on the user, for example, in congestion. In the vehicle in which the brake hold control is executed, even when the driver moves his/her foot away from the brake pedal, braking force of the stopped state is maintained. The brake hold control is released and the vehicle can be moved forward when the driver operates an accelerator pedal. Therefore, on a climbing road, the vehicle does not move backward even when the driver moves his/her foot off from the brake pedal and, hence, the starting is easier. On a downhill, the brake hold control is released when the accelerator pedal is stepped on and, therefore, acceleration due to the decline might be added to engine acceleration, possibly causing sudden starting. As a solution to this problem, a technique is disclosed in Japanese Patent Laying-Open No. 10-329671.

The brake control system disclosed in Japanese Patent Laying-Open No. 10-329671 has the brake hold function by which brake pressure applied from a master cylinder linked to the brake pedal is maintained even when one's foot is moved off from the brake pedal while the vehicle is stopped. The brake control system includes a gradient judging part for judging gradient of a road at least based on accelerator pedal position of the vehicle, and a control part for releasing the brake pressure holding state if the gradient of the road is downhill.

According to the brake control system disclosed in Japanese Patent Laying-Open No. 10-329671, the gradient of road is determined at least based on the accelerator pedal position and, if it is a downhill, the brake pressure holding state is released. Therefore, when the vehicle is started on a downhill slope, the brake pressure holding state has already been released. Accordingly, sudden starting of the vehicle because of simultaneous application of engine acceleration and acceleration due to the decline can be prevented.

In order to improve accuracy of detecting an acceleration request by the driver, sometimes it is determined that an acceleration request is made by the driver when the accelerator pedal position attains to a predetermine value, not when the accelerator pedal is simply operated, and on this determination, the brake hold control is released and driving force is output. In this situation, it follows that the driving force is output slightly delayed from the timing of operation of the accelerator pedal. Further, in order to avoid abrupt change in direction of acting torque applied to a drive line, for example, it is necessary to limit increase of driving force per unit time at the start of the vehicle. If such limit should be imposed when the brake hold control is released, the timing of output of the driving force in responses to the driver's request would further be delayed, and the vehicle starting characteristic as desired by the driver would not be realized.

SUMMARY OF THE INVENTION

The present invention was made in view of the foregoing and its object is to provide, in a vehicle having the brake hold function, a controller and a control method that can improve starting characteristic when the brake hold control is released.

The controller in accordance with the present invention controls a vehicle performing a brake hold control in which a brake is operated to hold braking force even when a brake pedal is not stepped on by a driver and the operation of the brake is stopped when a degree of acceleration request by the driver exceeds a predetermined first degree. The controller includes a detecting unit detecting the degree of acceleration request; and a control unit connected to the detecting unit. The control unit determines, while the brake hold control is being executed, whether or not the degree of acceleration request has exceeded a second degree smaller than the first degree, stops creep force of the vehicle until the degree of acceleration request exceeds the second degree, and recovers the creep force when the degree of acceleration request exceeds the second degree.

According to the present invention, while the brake hold control is being executed, creep force of the vehicle is stopped until the degree of acceleration request by the driver (for example, actual accelerator pedal position) exceeds the second degree smaller than the first degree, in order to reduce unnecessary energy consumption. The creep force refers to the driving force for moving the vehicle forward at slow speed, even in a state in which the accelerator pedal is not operated, or almost not operated. If the degree of acceleration request exceeds the second degree thereafter, the creep force is recovered even if brake hold control is continued. Therefore, by the time the degree of acceleration request attains to the first degree and the brake hold control is released, a torque corresponding to the creep force has already been acting on the vehicle drive line, in a direction of moving the vehicle forward. Therefore, when the brake hold control is released and the driving force is increased, the direction of torque acting on the drive line is not changed. As a result, it becomes unnecessary to limit the amount of increase of the driving force per unit time. As compared with the recovery of creep force at the time of releasing brake hold control, the amount of increase of the driving force per unit time can be made larger. As a result, for a vehicle having the brake hold control function, a controller is provided that can improve starting characteristic when the brake hold control is released.

Preferably, the control unit increases the creep force at a predetermined rate of increase with which the creep force maximizes in a period from the start of recovery of the creep force until the brake hold control is released, when the creep force is recovered.

According to the present invention, when the creep force is recovered, the creep force attains to the maximum in a period from the start of recovery of the creep force to the release of brake hold control. Therefore, starting characteristic at the time of releasing the brake hold control can be improved. In addition, as the creep force increases more moderately than when the creep force is maximized immediately after recovery of the creep force (that is, when the degree of acceleration request exceeds the second degree), abrupt change in torque applied to the drive line can be prevented.

More preferably, the control unit increases the creep force in accordance with the degree of acceleration request, when the creep force is recovered.

According to the present invention, when the creep force is recovered, the creep force is increased in accordance with the degree of acceleration request by the driver (for example, actual accelerator pedal position). By such an approach, unnecessary energy can be reduced by making the creep force smaller when, for example, the degree of acceleration request is low. Further, the creep force is increased to be closer to the maximum value as the degree of acceleration request comes closer to the first degree, to be ready for the release of brake hold control. Therefore, starting characteristic when the brake hold control is released can be improved. In addition, as the creep force increases more moderately than when the creep force is maximized when the degree of acceleration request exceeds the second degree, abrupt change in torque applied to the drive line can be prevented.

More preferably, the control unit calculates a creep torque reflection ratio based on a state of the vehicle, calculates a requested driving force of the vehicle based on the creep torque reflection ratio, controls driving force of the vehicle based on the requested driving force, limits the requested driving force until the requested driving force exceeds a predetermined value, stops the creep force by setting the creep torque reflection ratio to approximately zero until the degree of acceleration request exceeds the second degree, and increases the creep torque reflection ratio when the degree of acceleration request exceeds the second degree, thereby to recover the creep force.

According to the present invention, until the requested driving force calculated based on the creep torque reflection ratio exceeds a predetermined value, the requested driving force is limited and the driving force is limited. Therefore, when the degree of acceleration request exceeds the second degree, the creep torque reflection ratio is increased even when brake hold control is being executed, and the creep force is recovered. Since the creep torque reflection ratio is increased while the brake hold control is being executed, by the time the brake hold control is released, the requested driving force has already attained to a certain value that is close to or exceeding the predetermined value. Therefore, when the brake hold control is released, the driving force is not limited, or the time period in which the driving force is limited becomes shorter. Consequently, starting characteristic when the brake hold control is released can be improved.

The foregoing and other objects, features, aspects and advantages of the present invention will become more apparent from the following detailed description of the present invention when taken in conjunction with the accompanying drawing

DESCRIPTION OF THE PREFERRED EMBODIMENTS

In the following, an embodiment of the present invention will be described with reference to the figures. In the following description, the same components are denoted by the same reference characters. Their names and functions are also the same. Therefore, detailed description thereof will not be repeated.

Figure 1:
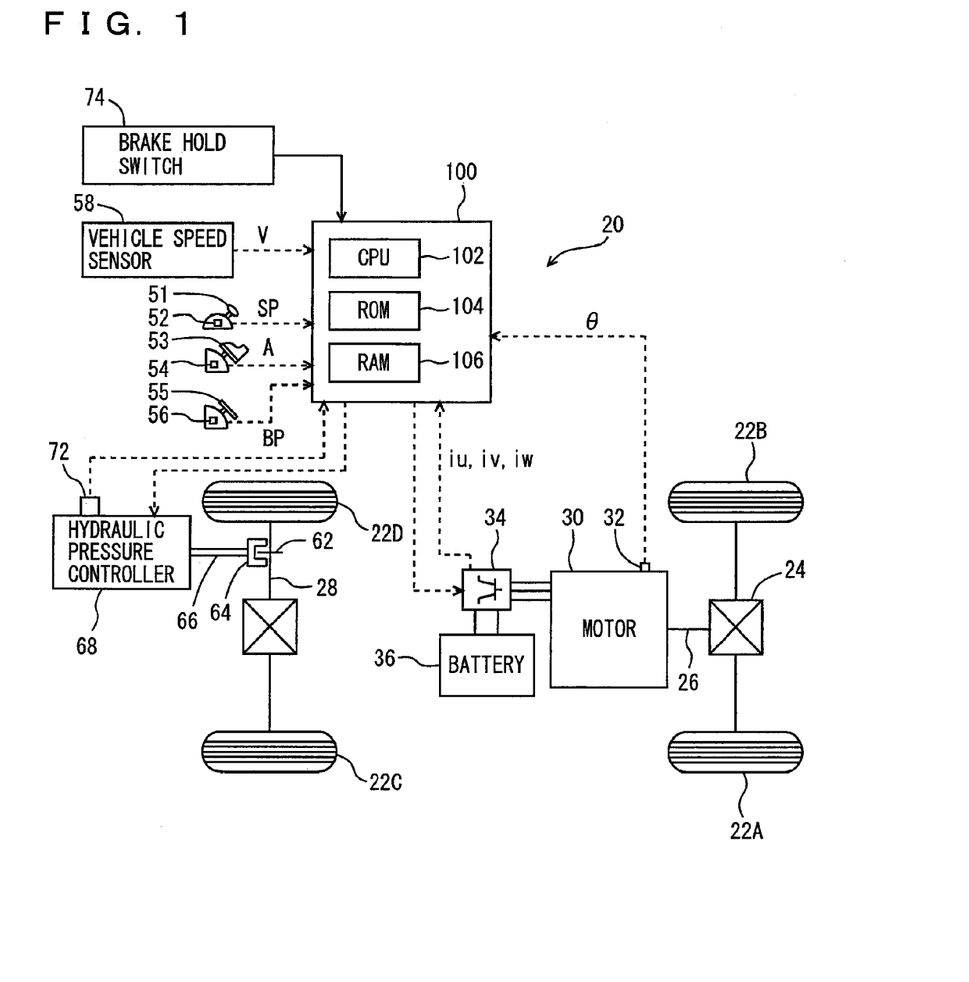
FIG. 1 shows a configuration of a vehicle on which the controller in accordance with an embodiment of the present invention is mounted.

Referring to FIG. 1, a configuration of an electric vehicle 20 mounting the controller in accordance with the present invention will be described. The vehicle to which the controller of the present invention is applicable is not limited to the electric vehicle shown in FIG. 1, and it may be an electric vehicle of different type. Further, it may not be an electric vehicle but a hybrid vehicle that runs with power from an engine and from a motor.

Electric vehicle 20 includes wheels 22A, 22B, 22C and 22D, a propeller shaft 26 connected to wheels 22A and 22B via a differential gear 24, a motor 30 for traveling, outputting power for driving wheels to propeller shaft 26, a battery 36 supplying electric power to motor 30 through an inverter 34, and an electronic control unit (ECU) 100 controlling electric vehicle 20 as a whole.

Motor 30 is formed as a well-known permanent magnet (PM) type synchronous motor generator, and it is driven by three-phase AC power from inverter 34.

Inverter 34 is formed as a well-known inverter circuit having six (6) switching elements, and supplies DC power from battery 36 as quasi three-phase AC power through PWM control (Pulse Width Modulation) and the like, to motor 30.

ECU 100 is formed as a microprocessor mainly consisting of a CPU (Central Processing Unit) 102, and in addition to CPU 102, it includes an ROM (Read Only Memory) 104 storing a processing program, an RAM (Random Access Memory) 106 temporarily storing data, and an input/output port, not shown.

Electric vehicle 20 further includes a brake disk 62 provided on a drive shaft 28 connected to wheel 22D, a brake mechanism 64, a brake pipe 66, and a hydraulic pressure controller 68. Brake disk 62, brake mechanism 64 and brake pipe 66 may be provided for each of the wheels 22A, 22B, 22C and 22D.

Brake mechanism 64 receives pressure of brake oil filled in brake pipe 66, and in accordance with the received brake oil pressure, pinches brake disk 62 and generates frictional braking force (hydraulic brake). Hydraulic pressure controller 68 receives a brake control signal from ECU 100, and adjusts the brake oil pressure in brake pipe 66 such that it attains to a value corresponding to the brake control signal.

To ECU 100, a detection signal θ from a rotational position detection sensor 32 for detecting a rotational position of a rotor of motor 30, phase currents iu, iv and iw from current sensors, not shown, provided for respective phases of inverter 34, a shift position SP from a shift position sensor 52 detecting an operational position of a shift lever 51, an actual accelerator pedal position A from an accelerator pedal position sensor 54 detecting an amount of operation of accelerator pedal 53, a brake pedal operation amount BP from a brake pedal position sensor 56 detecting an amount of operation of brake pedal 55, vehicle speed V from a vehicle speed sensor 58 and the like are input through an input port.

Accelerator pedal position sensor 54 detects actual accelerator pedal position A as a degree of acceleration request by the driver, and transmits a signal representing the detected result to ECU 100. The actual accelerator pedal position A here means the ratio of present amount of operation to the amount of operation when accelerator pedal 53 is fully opened. Detection of actual accelerator pedal position A by accelerator pedal position sensor 54 is not limiting. By way of example, the amount of operation at present of accelerator pedal 53 may be detected by accelerator pedal position sensor 54 and the actual accelerator pedal position A may be detected by ECU 100.

Figure 2:
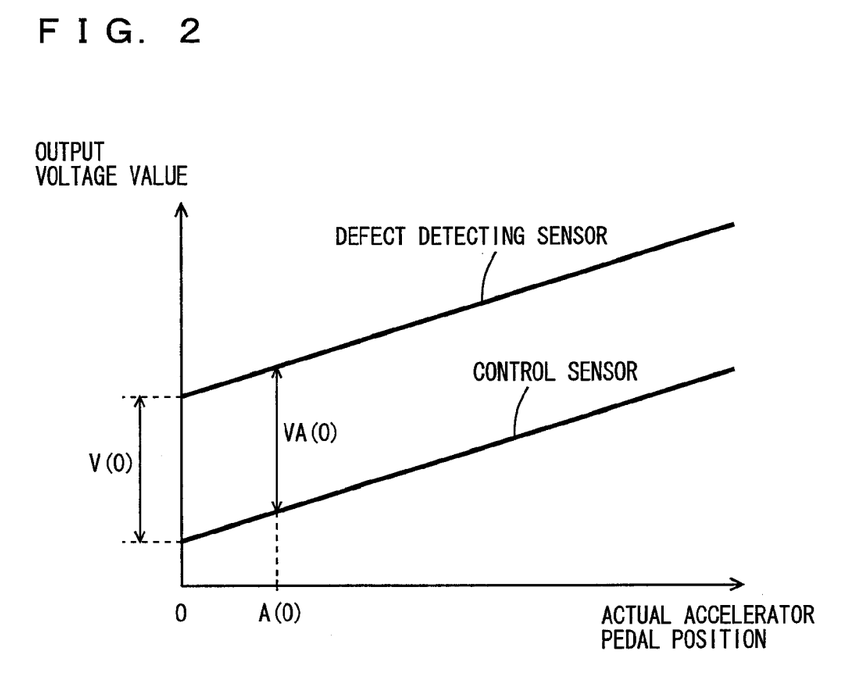
FIG. 2 shows an output characteristic of an accelerator pedal position sensor.

Accelerator pedal position sensor 54 includes two position sensors, that is, a control sensor and a defect detecting sensor, not shown, to ensure reliability of detection. The control sensor and the defect detecting sensor have different output characteristics, as shown in FIG. 2. The difference between output voltages from the control sensor and the defect detecting sensor is $V(0)$ when the actual accelerator pedal position A is 0. The output voltage value of control sensor and the output voltage value of defect detecting sensor have such characteristic that the voltages increase at the same rate, while the actual accelerator pedal position A increases. Therefore, as long as the control sensor and the defect detecting sensor are operating normally, the difference between the output voltages is kept at $V(0)$. Utilizing such a characteristic, accelerator pedal position sensor 54 monitors the voltage difference $VA(0)$ when the actual accelerator pedal position A attains to a predetermined accelerator pedal position $A(0)$, and as long as the voltage difference $VA(0)$ is maintained at $V(0)$, it determines that accelerator pedal position sensor 54 is operating normally. Specifically, in order to ensure reliability of acceleration request by the driver, it is necessary that the actual accelerator pedal position A becomes larger than the predetermined position $A(0)$.

Further, to ECU 100, signals from a brake hydraulic pressure sensor 72 and a brake hold switch 74 are input through the input port.

Brake hydraulic pressure sensor 72 detects brake oil pressure in brake pipe 66 adjusted by hydraulic pressure controller 68, and outputs a signal representing the result of detection to ECU 100.

Brake hold switch 74 is for selecting whether or not the driver wishes to execute the brake hold control, which will be described later. If brake hold switch 74 is on, brake hold switch 74 transmits a signal indicating that the driver wishes execution of brake hold control, to ECU 100. If brake hold switch 74 is off, brake hold switch 74 transmits a signal indicating that the driver does not wish execution of brake hold control, to ECU 100.

When accelerator pedal 53 is operated, ECU 100 sets a control accelerator pedal position AC based on the actual accelerator pedal position A and on the state of vehicle. The control accelerator pedal position AC is used for output control of the driving force, as the degree of control of acceleration request by the driver. ECU 100 calculates requested driving force F based on the control accelerator pedal position AC and the vehicle speed V, and controls driving of motor 30 such that a torque corresponding to the requested driving force F is output by motor 30. Specifically, for controlling output of the driving force of electric vehicle 20, the actual accelerator pedal position A is not directly used, but the control accelerator pedal position AC set by ECU 100 based on the actual accelerator pedal position A is used. If the control accelerator pedal position AC is approximately zero, ECU 100 calculates the creep force (driving force for moving forward the electric vehicle at at slow speed) in accordance with the actual accelerator pedal position and the state of vehicle, and provides the calculated creep force as the requested driving force F.

ECU 100 generates a switching control signal controlling on/off of a switching element forming inverter 34, such that a motor current that generates torque corresponding to the requested driving force F described above is supplied to motor 30. Inverter 34 performs power conversion in response to the switching control signal, and thereby supplies AC power to motor 30.

Further, when brake hold switch 74 is on, ECU 100 executes the brake hold control to reduce load of braking operation by the driver in, for example, congestion. Specifically, ECU 100 detects shift position SP, vehicle speed V, actual accelerator pedal position A, and brake pedal operation amount BP. When the shift position SP is at a forward position (D position), the actual accelerator pedal position A is approximately zero and the vehicle speed V is approximately zero (that is, the vehicle is stopped) and the brake pedal operation amount BP exceeds a predetermined threshold value, ECU 100 executes the control of maintaining the braking force in the stopped state even if the brake pedal operation amount BP lowers thereafter.

When the brake hold control starts, ECU 100 sets the control accelerator pedal position AC to zero and stops the creep force so that power supply to motor 30 is stopped, in order to reduce unnecessary energy consumption.

When accelerator pedal 53 is operated and the actual accelerator pedal position A attains to be larger than the predetermined position $A(0)$ mentioned above (that is, when the reliability of acceleration request by the driver is ensured), ECU 100 cancels execution of the brake hold control, and gradually increases the control accelerator pedal position AC so that it converges to the actual accelerator pedal position A.

Further, until the requested driving force F exceeds a predetermined driving force $F(0)$, ECU 100 executes a process (moderate changing process) of moderately increasing the requested driving force F. Consequently, abrupt change in the acting direction of torque applied to the drive line such as differential gear 24 can be prevented, whereby durability of the drive line is improved, and shock at the start of the vehicle can be prevented.

In the present embodiment, when the brake hold control is released, the control accelerator pedal position AC is increased after the actual accelerator pedal position A attains to the predetermined position $A(0)$ and, therefore, the requested driving force F, which is based on the control accelerator pedal position AC, starts to increase slightly delayed from the operation timing of accelerator pedal 53, and hence, driving force output timing delays. Further, until the requested driving force F exceeds a predetermined driving force $F(0)$, the above-described process of moderately changing the requested driving force F is executed and, if this moderately changing process should be executed while the brake hold control is released, the output timing of driving force in accordance the actual accelerator pedal position A would be further delayed. Then, the starting characteristic of the vehicle as requested by the user cannot be realized.

In view of the foregoing, by the controller in accordance with the present invention, the creep force stopped at the start of brake hold control is recovered before releasing the brake hold control, so as to improve the starting characteristic of the vehicle when the brake hold control is released.

Figure 3:
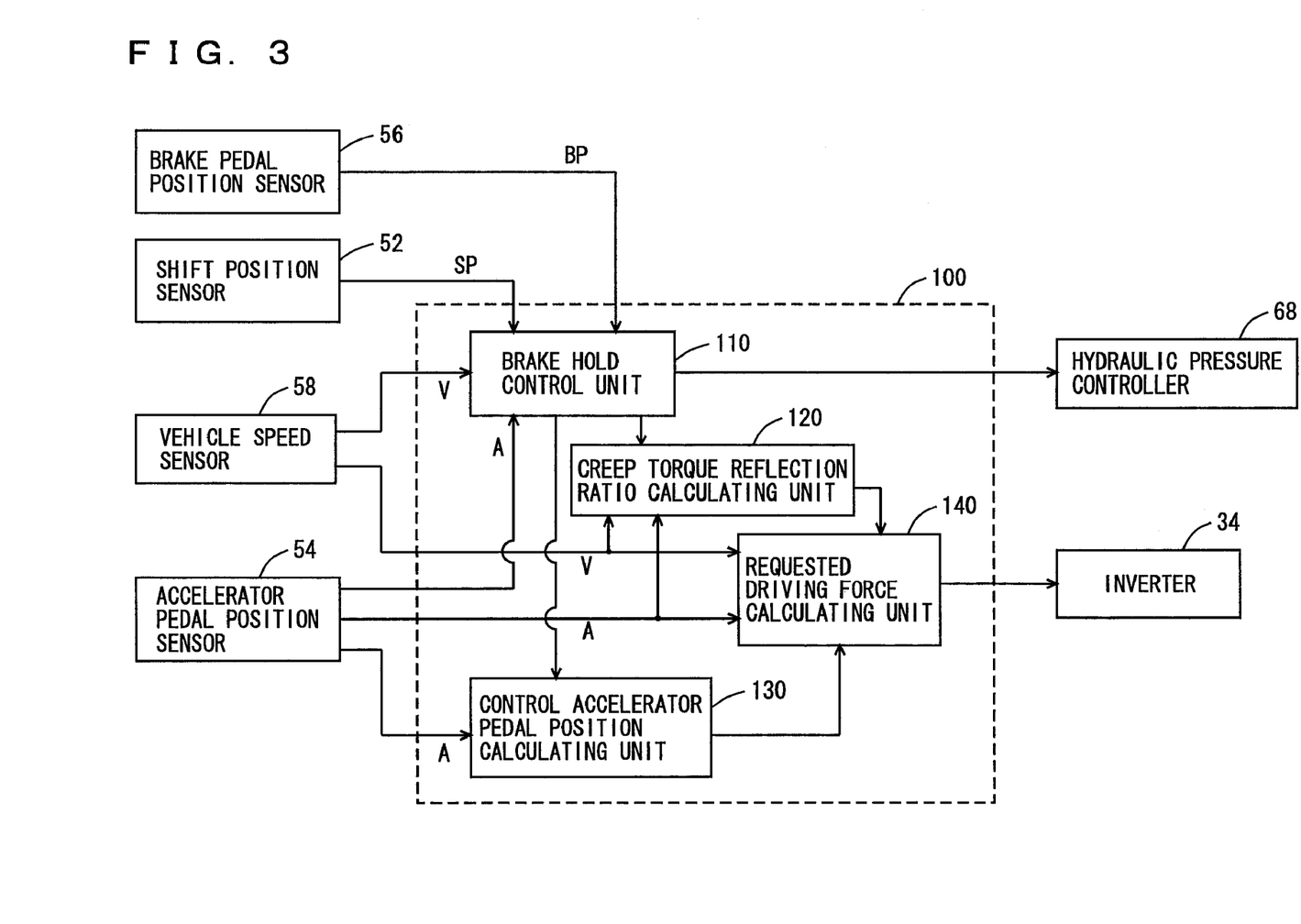
FIG. 3 is a functional block diagram of the controller in accordance with an embodiment of the present invention.

Referring to FIG. 3, the functional block of the controller in accordance with the present invention will be described. As shown in FIG. 3, the controller includes a brake hold control unit 110, a creep torque reflection ratio calculating unit 120, a control accelerator pedal position calculating unit 130, and a requested driving force calculating unit 140.

Brake hold control unit 110 outputs a command signal to hydraulic pressure controller 68 to execute and release the brake hold control, based on shift position SP from shift position sensor 52, brake pedal operation amount BP from brake pedal position sensor 56, vehicle speed V from vehicle speed sensor 58, and actual accelerator pedal position A from accelerator pedal position sensor 54, and also outputs the command signal to creep torque reflection ratio calculating unit 120 and to control accelerator pedal position calculating unit 130.

Creep torque reflection ratio calculating unit 120 calculates the creep torque reflection ratio R based on vehicle speed V from vehicle speed sensor 58, actual accelerator pedal position A from accelerator pedal position sensor 54, and a signal from brake hold control unit 110. The creep torque reflection ratio R is used for calculating the creep force. The method of calculating creep force using the creep force reflection ratio will be described later.

Control accelerator pedal position calculating unit 130 sets the control accelerator pedal position AC based on the signal from brake hold control unit 110 and on the accrual accelerator pedal position A from accelerator pedal position sensor 54, and outputs it to requested driving force calculating unit 140.

Requested driving force calculating unit 140 calculates the requested driving force F based on vehicle speed V from vehicle speed sensor 58, actual accelerator pedal position A from accelerator pedal position sensor 54, creep torque reflection ratio R from creep torque reflection ratio calculating unit 120, and control accelerator pedal position AC from control accelerator pedal position calculating unit 130, and controls inverter 34 such that the torque in accordance with the calculated requested driving force F is output from motor 30.

The controller in accordance with the present embodiment having such functional blocks may be implemented by hardware mainly consisting of digital or analog circuits, or by CPU 102 and ROM 104 included in ECU 100 and software mainly consisting of a program or programs read from ROM 104 and executed by CPU 102. It is generally considered that hardware implementation is advantageous in speed of operation, while software implementation is advantageous in design change. In the following, an example of the controller implemented by software will be described.

Figure 4:
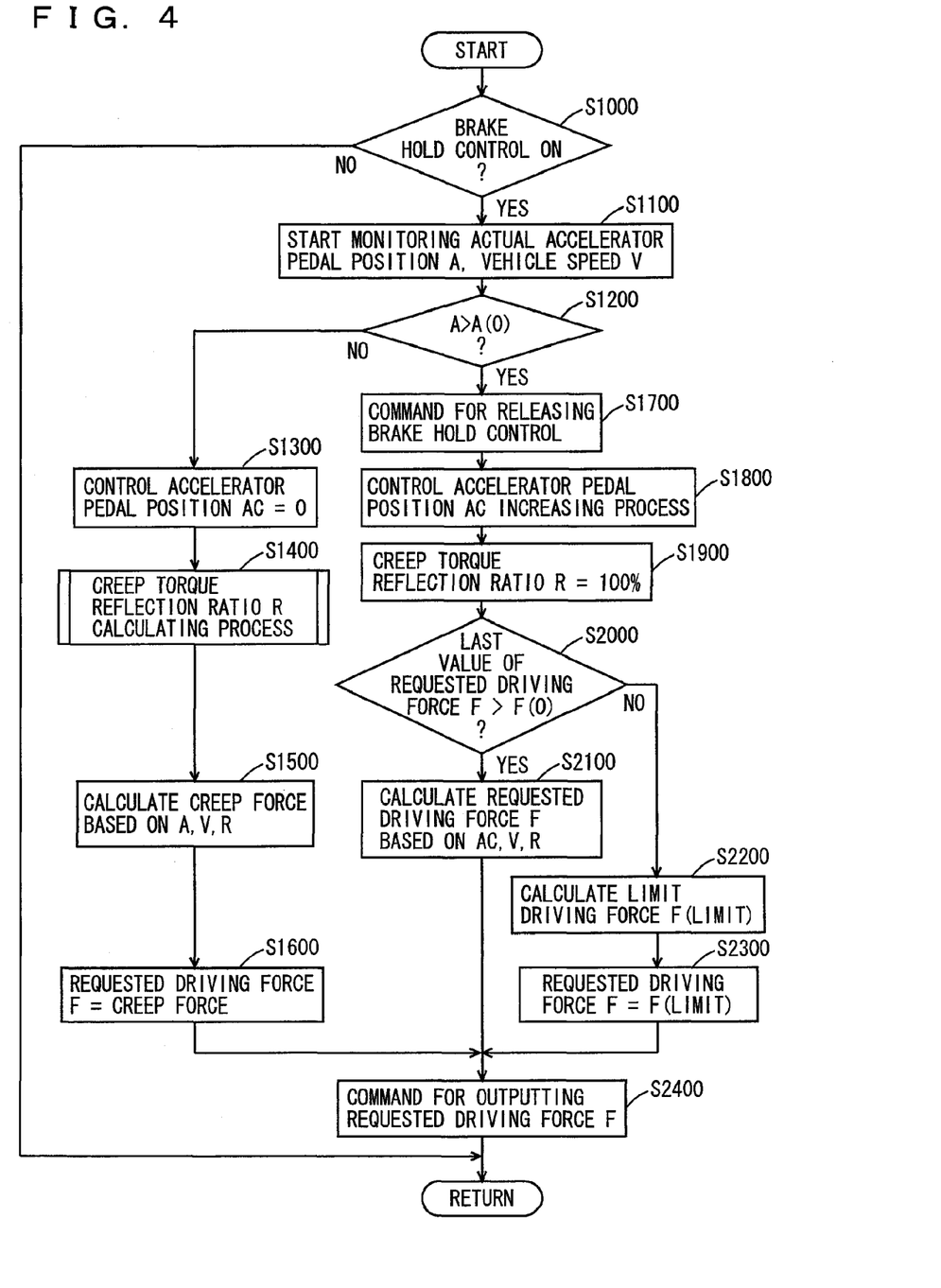
FIG. 4 is a (first) flowchart representing a control structure of an ECU as the controller in accordance with the embodiment of the present invention.

Referring to FIG. 4, the control structure of a program executed by ECU 100 as the controller in accordance with the present embodiment will be described. The program is repeatedly executed with a predetermined cycle time.

At step (hereinafter "step" will be simply denoted by "S") 1000, ECU 100 determines whether the brake hold control is being executed or not. If brake hold control is being executed (YES at S1001), the process proceeds to S1100. If not (NO at S1000), the process ends.

At S1100, ECU 100 starts monitoring actual accelerator pedal position A from accelerator pedal position sensor 54 and vehicle speed V from vehicle speed sensor 58.

At S1200, ECU 100 determines whether or not the actual accelerator pedal position A is larger than the predetermined position A(0). The predetermined accelerator pedal position A(0) is the value allowing determination that accelerator pedal position sensor 54 is operating normally and ensuring reliability of acceleration request by the driver. If it is larger than the predetermined position A(0) (YES at S1200), the process proceeds to S1700. Otherwise (NO at S1200), the process proceeds to S1300.

At S1300, ECU 100 sets the control accelerator pedal position AC to 0. At S1400, ECU 100 performs the process for calculating creep torque reflection ratio. The method of calculating the creep torque reflection ratio R will be described in detail later.

At S1500, ECU 100 calculates the creep force based on actual accelerator pedal position A, vehicle speed V and creep torque reflection ratio R. By way of example, ECU 100 calculates as the creep force a product of creep torque reflection ratio R and the driving force calculated from actual accelerator pedal position A and vehicle speed V.

At S1700, ECU 100 outputs a command for releasing brake hold control to hydraulic pressure controller 68.

At S1800, ECU 100 performs a process for increasing control accelerator pedal position AC. ECU 100 increases control accelerator pedal position AC for a predetermined time period, so that it converges to the actual accelerator pedal position A. The method of increasing the control accelerator pedal position AC is not limited to the above.

At S1900, ECU 100 sets creep torque reflection ratio to 100% (maximum value).

At S2000, ECU 100 determines whether the last value of requested driving force F (the value of requested driving force F calculated in the last cycle time) exceeded the predetermined driving force F(0) or not. If it exceeded the predetermined driving force F(0) (YES at S2000), the process proceeds to S2100. Otherwise (NO at S2000), the process proceeds to S2200.

At S2100, ECU 100 calculates the requested driving force F based on control accelerator pedal position AC, vehicle speed V and creep torque reflection ratio R. By way of example, ECU 100 calculates, as the requested driving force F, a product of creep torque reflection ratio R and the driving force calculated from control accelerator pedal position AC and vehicle speed V. It is noted that at step S1900, creep torque reflection ratio R is set to 100% and, therefore, the requested driving force F calculated in this process is substantially the value calculated from control accelerator pedal position AC and vehicle speed V.

At S2200, ECU 100 calculates a limit driving force F(LIMIT). By way of example, ECU 100 adds a predetermined small amount of increase to the last value of requested driving force F, and provides the result as the limit driving force F(LIMIT). At S2300, ECU 100 sets the calculated limit driving force F(LIMIT) as the requested driving force F. The process of steps S2200 and S2300 corresponds to the process for moderately changing requested driving force F described above.

At S2400, ECU 100 transmits a command for outputting requested driving force F to inverter 34.

Figure 5:
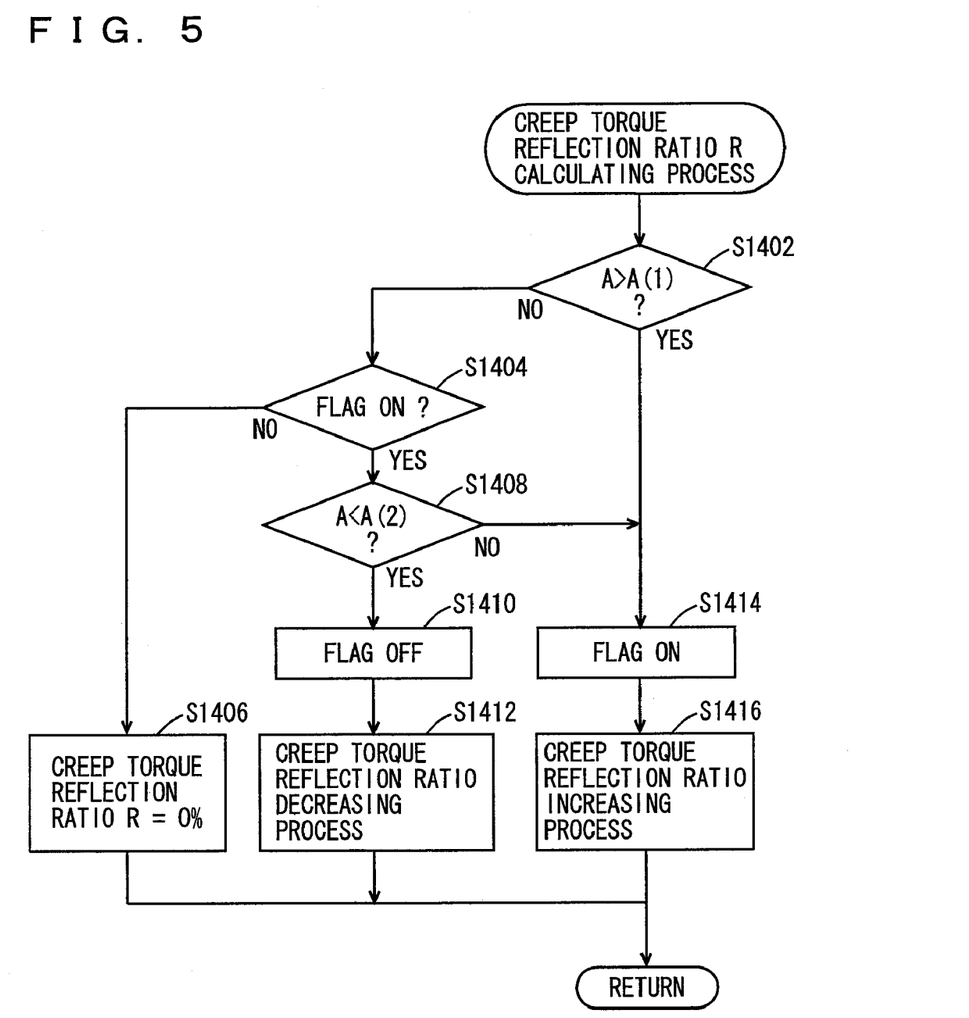
FIG. 5 is a (second) flowchart representing a control structure of an ECU as the controller in accordance with the embodiment of the present invention.

Referring to FIG. 5, the control structure of the program executed by ECU 100 in the process of S1400 of FIG. 4 (the process for calculating creep torque reflection ratio R) will be described.

At S1402, ECU 100 determines whether or not actual accelerator pedal position A is larger than a predetermined position A(1). The predetermined position A(1) is a value at least allowing detection of stepping of accelerator pedal 53, and it is larger than approximately zero and smaller than the predetermined position A(0). If it is larger than the predetermined position A(1) (YES at S1402), the process proceeds to S1414. Otherwise (NO at S1402), the process proceeds to S1404.

At S1404, ECU 100 determines whether or not a flag is on. The flag indicates whether the process for increasing creep torque reflection ratio R is being executed or not. The flag is off in the initial state and it is set on when the process for increasing creep torque reflection ratio R is executed. If the flag is on (YES at S1404), the process proceeds to S1408. Otherwise (NO at S1404), the process proceeds to S1406.

At S1406, ECU 100 sets creep torque reflection ratio R to 0% (minimum value).

At S1408, ECU 100 determines whether or not actual accelerator pedal position A has come to be lower than a predetermined position A(2). The predetermined position A(2) is larger than approximately zero and smaller than the predetermined position A(1). If it is lower than the predetermined position A(2) (YES at S1408), the process proceeds to S1410. Otherwise (NO at S1408), the process proceeds to S1414.

At S1410, ECU 100 sets the flag off. At S1412, ECU 100 executes a decreasing process for decreasing creep torque reflection ratio R to 0% at a predetermined rate of decrease. The predetermined rate of decrease may be the same as the rate of decrease when the brake hold control is not executed, or it may be a different rate determined only for this process.

At S1414, ECU 100 sets the flag on. At S1416, ECU 100 executes an increasing process for increasing creep torque reflection ratio R to 100% at a predetermined rate of increase. The predetermined rate of increase is a value that increases creep torque reflection ratio R to 100% in a period from the start of increase of creep torque reflection ratio R until the brake hold control is released (that is, until the actual accelerator pedal position A exceeds the predetermined position A(0)), when the driver steps on the accelerator pedal 53 to generate the driving force. The predetermined rate of increase is stored in advance as a constant value. The process for increasing the creep torque reflection ratio R is not limited to the above.

The driving force of electric vehicle 20 controlled by ECU 100 as the controller in accordance with the present embodiment based on the structure and flowchart as above will be described in the following.

Figure 6:
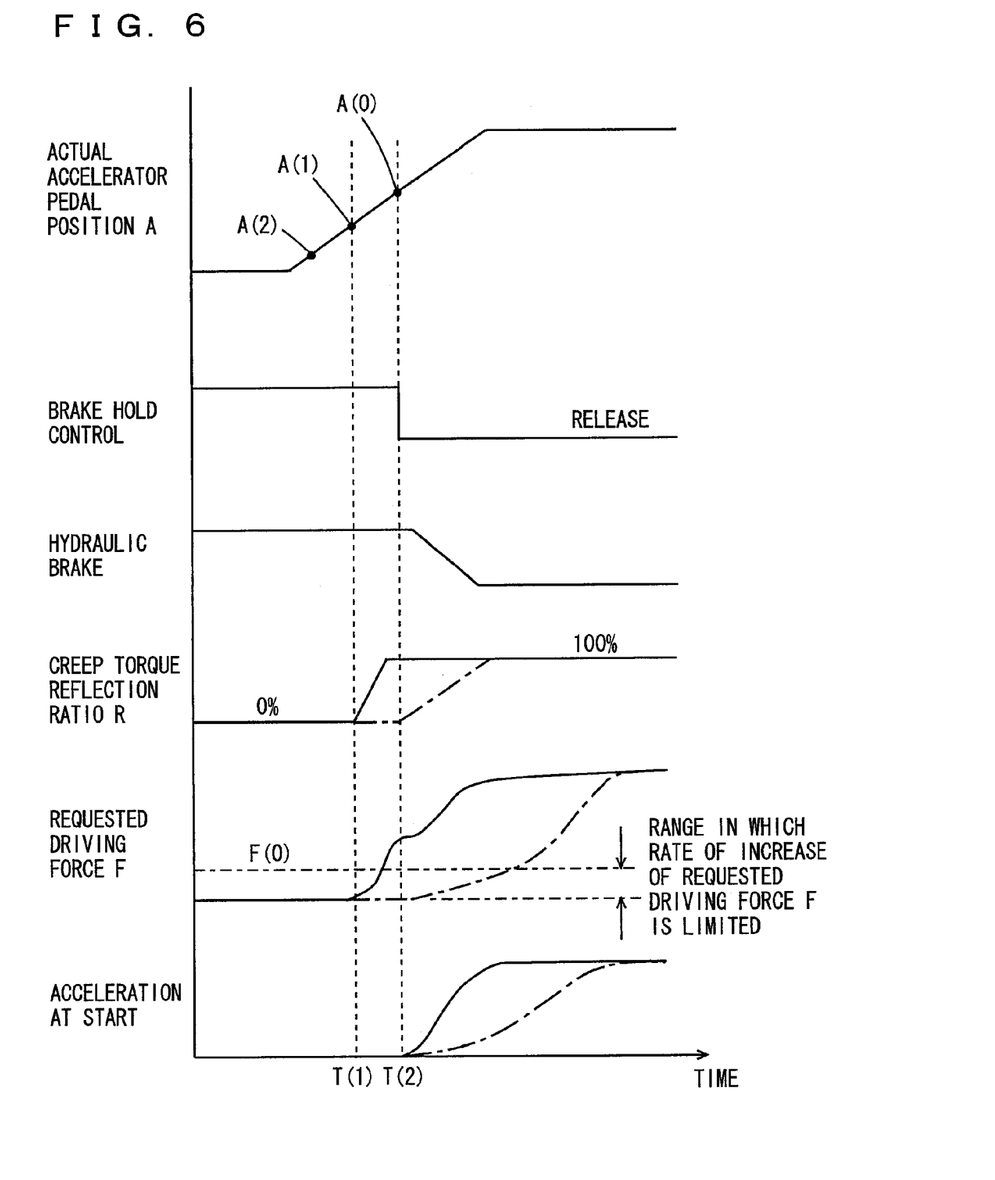
FIG. 6 is a timing chart of a requested driving force F of the vehicle on which the controller in accordance with the embodiment of the present invention is mounted.

Assume that the driver steps on accelerator pedal 53 while the brake hold control is being executed (YES at S1000). As shown in FIG. 6, when actual accelerator pedal position A reaches position A(1) at time T(1) (NO at S1200, YES at S1402), creep torque reflection ratio R is increased to 100% at the predetermined rate of increase (S1416). Based on actual accelerator pedal position A, vehicle speed V and creep torque reflection ratio R, the creep force is calculated (S1500), and the calculated creep force is set as the requested driving force F (S1600). As a result, by the time T(2) when actual accelerator pedal position A reaches A(0) and the brake hold control is released, the requested driving force F is increased.

Thereafter, when actual accelerator pedal position A reaches position A(0) (YES at S1200) and brake hold control is released (S1700) at time T(2), the hydraulic brake decreases gradually and the process for increasing control accelerator pedal position AC is performed (S1800). Here, at T(2), the range, in which the rate of increase of requested driving force F is limited, has been exceeded as shown in FIG. 6 and the requested driving force F is above the predetermined driving force F(0) (YES at S2000). Therefore, the requested driving force F is not limited and, based on control accelerator pedal position AC, vehicle speed V and creep torque reflection ratio R, the requested driving force F is calculated (S2100). Therefore, as compared with an approach in which the creep torque reflection ratio R is increased from time point T(2) (see chain-dotted line of FIG. 6), starting characteristic can be improved when the brake hold control is released.

Further, as shown in FIG. 6, creep torque reflection ratio R increases gradually to 100% at a constant rate of increase until the time point T(2) at which the brake hold control is released (S1416). Therefore, as compared with increase to 100% by the time T(1), abrupt change in torque applied to the drive line can be reduced.

As described above, according to the controller of the present embodiment, the creep torque reflection ratio R is increased before releasing the brake hold control, and the creep force is recovered. Therefore, when the brake hold control is released, the requested driving force F is not limited, as it has already been out of the range limiting the rate of increase of requested driving force F. As a result, starting characteristic when the brake hold control is released can be improved.

In the present embodiment, an example in which the rate of increase of creep torque reflection ratio R is stored in advance as a constant value at the process of step S1416 of FIG. 5 has been described. The rate of increase may be changed, by way of example, in accordance with the actual accelerator pedal position A. By this approach, it becomes possible to make smaller the creep torque reflection ratio R when actual accelerator pedal position A is small and to increase creep torque reflection ratio R to be closer to 100% as the actual accelerator pedal position A comes closer to position A(0).

In the present embodiment, increase of creep force by increasing the creep torque reflection ratio has been described. The creep force, however, may be increased directly in accordance with the actual accelerator pedal position A.

In the present embodiment, application of the controller in accordance with the present invention to a hybrid vehicle or an electric vehicle running with motor power has been described. The controller of the present invention is also applicable to a vehicle having an engine and an automatic transmission. In such a case, the automatic transmission set to a state not transmitting power at the start of brake hold control may be switched to the state of transmitting power before releasing the brake hold control, to recover the creep force.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A controller for a vehicle performing a brake hold control in which a brake is operated to hold braking force even when a brake pedal is not stepped on by a driver and the operation of said brake is stopped when a degree of acceleration request by the driver exceeds a predetermined first degree, said vehicle including a motor operating and thereby generating driving force for said vehicle, said controller comprising:

a control accelerator pedal position calculating unit detecting said degree of acceleration request;

a creep torque reflection ratio calculating unit that determines, while said brake hold control is being executed, whether said degree of acceleration request has exceeded a second degree smaller than said first degree, stops creep force of said vehicle until said degree of acceleration request exceeds said second degree, by stopping the operation of said motor, and recovers said creep force when said degree of acceleration request exceeds said second degree by operating said motor, and a control unit that controls said motor, in a case where said degree of acceleration request exceeds said first degree, so that an amount of increase of the driving force for said vehicle per unit time is limited when the driving force for said vehicle is smaller than a predetermined value, and so that driving force is generated in accordance with said degree of acceleration request when the driving force for said vehicle is larger than said predetermined value.

2. The controller according to claim 1, wherein said creep torque reflection ratio calculating unit increases said creep force at a predetermined rate of increase with which said creep force is maximized in a period from the start of recovery of said creep force until said brake hold control is released, when said creep force is recovered.

3. The controller according to claim 1, wherein said creep torque reflection ratio calculating unit increases said creep force in accordance with said degree of acceleration request, when said creep force is recovered.

4. The controller according to claim 1, wherein said motor generates driving force corresponding to a requested driving force, said creep torque reflection ratio calculating unit stops said creep force by setting said requested driving force to approximately zero and stopping the operation of said motor until said degree of acceleration request exceeds said second degree, and recovers said creep force by increasing said requested driving force and operating said motor when said degree of acceleration request exceeds said second degree, and in a case where said degree of acceleration request exceeds said first degree, said control unit limits an amount of increase of said requested driving force per unit time when said requested driving force is smaller than said predetermined value, and sets said requested driving force to a value in accordance with said degree of acceleration request when said requested driving force is larger than said predetermined value.

* * * * *